(12) United States Patent
Boehringer et al.

(10) Patent No.: US 6,167,981 B1
(45) Date of Patent: Jan. 2, 2001

(54) OPERATING ELEMENT ARRANGEMENT FOR CONTROLLING MOTOR VEHICLE LONGITUDINAL AND TRANSVERSE MOVEMENTS

(75) Inventors: Michael Boehringer, Waiblingen; Lutz Eckstein, Stuttgart, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 08/877,404

(22) Filed: Jun. 17, 1997

(30) Foreign Application Priority Data

Jun. 26, 1996 (DE) .............................. 196 25 497

(51) Int. Cl.$^7$ .................................. B60K 26/00

(52) U.S. Cl. .......................... 180/333; 180/334

(58) Field of Search ................. 180/333, 334, 180/335; 74/471; 338/128; 244/234, 236

(56) References Cited

U.S. PATENT DOCUMENTS

| | | | |
|---|---|---|---|
| 3,022,850 | | 2/1962 | Bidwell et al. . |
| 3,323,607 | * | 6/1967 | Futamata .............................. 180/333 |
| 3,814,199 | * | 6/1974 | Jones ...................................... 180/6.5 |
| 4,109,745 | * | 8/1978 | Hveem ................................. 180/333 |
| 4,151,892 | * | 5/1979 | Francken .......................... 180/77 H |
| 4,476,954 | * | 10/1984 | Johnson et al. ...................... 180/333 |
| 5,042,314 | * | 8/1991 | Rytter et al. ............................. 74/335 |
| 5,086,870 | * | 2/1992 | Bolduc ................................. 180/333 |
| 5,261,291 | * | 11/1993 | Schoch et al. .......................... 74/484 |
| 5,312,217 | * | 5/1994 | Lawrence et al. ......................... 414/4 |
| 5,392,871 | * | 2/1995 | McFarland .......................... 180/6.48 |
| 5,409,074 | * | 4/1995 | Wilson et al. ........................ 180/6.5 |
| 5,497,847 | * | 3/1996 | Ota et al. .............................. 180/333 |
| 5,591,924 | * | 1/1997 | Hilton .................................... 73/862 |
| 5,836,416 | * | 11/1998 | Müller et al. ......................... 180/333 |
| 5,845,735 | * | 12/1998 | Müller et al. ......................... 180/322 |
| 6,006,852 | * | 12/1999 | Eckstein et al. ...................... 180/333 |
| 6,039,142 | * | 3/2000 | Eckstein et al. ...................... 180/333 |

FOREIGN PATENT DOCUMENTS

| | | | |
|---|---|---|---|
| 4404594 A1 | * | 8/1995 | (DE) . |
| 196 00 138 | | 1/1996 | (DE) . |
| 2 110 428 | | 6/1983 | (GB) . |
| 3-139472 | | 6/1991 | (JP) . |
| 6-1255 | | 1/1994 | (JP) . |
| 6-92241 | | 4/1994 | (JP) . |

OTHER PUBLICATIONS

13th International Technical Conference on Experimental Safety Vehicles, P. Bränneby et al., Nov. 1991, pp. 224–230 and cover sheet.

Arbeitsplatz Fahrer—Eine ergonomische Studie, H. Bubb, Mar. 1985, 11 pages.

* cited by examiner

Primary Examiner—Kevin Hurley
Assistant Examiner—Andrew J. Fischer
(74) Attorney, Agent, or Firm—Evenson, McKeown, Edwards & Lenihan, P.L.L.C.

(57) ABSTRACT

An operating element arrangement and method controls the longitudinal and transverse movements of a motor vehicle by using a manually actuatable regulating element which is stationary in the vehicle longitudinal direction and controls the longitudinal movement of the vehicle as a function of the actuating force exerted on the regulating element in the vehicle longitudinal direction. The regulating element also serves to control the vehicle transverse movement of the vehicle. For this purpose, the regulating element is arranged movably in the vehicle transverse direction of the vehicle. The transverse movement of the vehicle is controlled as a function of the transverse deflection of the regulating element or as a function of the actuating force exerted in the transverse direction of the vehicle.

4 Claims, 1 Drawing Sheet

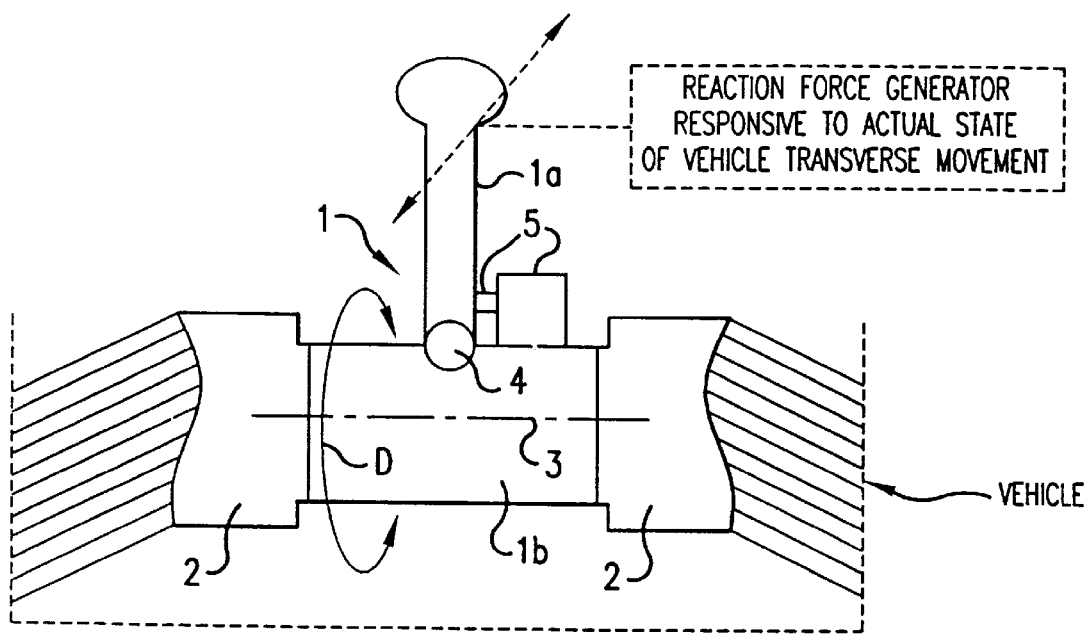

OPERATING ELEMENT ARRANGEMENT FOR CONTROLLING MOTOR VEHICLE LONGITUDINAL AND TRANSVERSE MOVEMENTS

This application is related to application Ser. No. 08/881,384 filed on Jun. 24, 1997 in the name of Michael BOEHRINGER et al. for OPERATING ELEMENT ARRANGEMENT FOR CONTROLLING MOTOR VEHICLE LONGITUDINAL AND TRANSVERSE MOVEMENTS; application Ser. No. 08/881,386 filed on Jun. 24, 1997 in the name of Lutz ECKSTEIN et al. for OPERATING ELEMENT ARRANGEMENT FOR CONTROLLING MOTOR VEHICLE LONGITUDINAL AND TRANSVERSE MOVEMENTS; application Ser. No. 08/883,502 filed on Jun. 26, 1997 in the name of Lutz ECKSTEIN et al. for OPERATING ELEMENT ARRANGEMENT FOR CONTROLLING MOTOR VEHICLE LONGITUDINAL AND TRANSVERSE MOVEMENTS; application Ser. No. 08/882,930 filed on Jun. 26, 1997 in the name of Lutz ECKSTEIN et al. for OPERATING ELEMENT ARRANGEMENT FOR CONTROLLING MOTOR VEHICLE LONGITUDINAL AND TRANSVERSE MOVEMENTS; application Ser. No. 08/883,480 filed on Jun. 26, 1997 in the name of Michael BOEHRINGER et al. for OPERATING ELEMENT ARRANGEMENT FOR CONTROLLING MOTOR VEHICLE LONGITUDINAL AND TRANSVERSE MOVEMENTS.

BACKGROUND AND SUMMARY OF THE INVENTION

This application claims the priority of 196 25 497.3, the disclosure of which is expressly incorporated by reference herein.

The present invention relates to an operating element arrangement for controlling longitudinal and transverse movements of a motor vehicle, and more particularly, to an arrangement with a manually actuatable regulating element which is arranged so as to be stationary in the longitudinal direction of the vehicle such that the longitudinal movement of the vehicle is controlled as a function of the actuating force exerted on the regulating element in the vehicle longitudinal direction.

Conventionally, the steering wheel in an automobile serves as an operating element for controlling the transverse movement and the accelerator and the brake pedal serve as operating elements for controlling the longitudinal movement. As an alternative to the conventional steering wheel, P. Bränneby et al., "Improved Active and Passive Safety by Using Active Lateral Dynamic Control and an Unconventional Steering Unit", 13th International Technical Conference on Experimental Safety Vehicles, Nov. 4 to 7 1991, Proceedings Vol. 1, page 224, propose an operating lever which is arranged, for example, on the center console of the vehicle.

Furthermore, a common operating element for controlling the longitudinal and transverse dynamics of a motor vehicle is known, preferably in this known element, the longitudinal movement is controlled by actuating the operating element in the longitudinal direction of the vehicle, and the transverse movement is controlled by actuating the operating element in the transverse direction, in particular as a rotational movement corresponding to the conventional steering wheel. A distinction is made between passive, isometric and active configurations for actuating the operating element.

In the passive configuration, the driving dynamics variable to be controlled is set as a function of the deflection of the operating element in the associated direction of actuation, without any feedback on the actual state of this variable to the operating element. The latter also applies to the isometric system configuration, in which the driving dynamics variable is set as a function of the actuating force exerted on the operating element in the associated direction of actuation, while the operating element remains fixed in this direction of actuation.

In the active system configuration, the driving dynamics variable is set as a function of the deflection of the operating element or of the actuating force exerted on the latter, at the same time the driver receiving a feedback on the actual state of the system controlled by him or her, the feedback being detectable by the driver on the operating element. As a function of the actual state of the system, a reaction force is automatically exerted on the operating element or the operating element is deflected in the associated direction of actuation via a suitable actuator assembly.

U.S. Pat. No. 3,022,850 discloses an operating element of passive configuration for controlling both longitudinal and transverse dynamics in the form of a control stick which is mounted on a frame pivotably about a horizontal transverse axis. The frame itself is rotatable about a horizontal longitudinal axis. H. Bubb, Arbeitsplatz Fahrer—eine ergonomische Studie [Driver's area—an ergonomic study], Automobil-Industrie [Automobile Industry] 3/85, page 265, discloses an operating element which contains two mechanically interconnected plate-like handles which are located next to one another and which are attached to the end of a bar which is guided so as to be longitudinally movable on the vehicle center console. The longitudinal dynamics of the vehicle are controlled by displacing the bar in the longitudinal direction of the vehicle, and the transverse dynamics are influenced by rotating the two plate-like handles in the transverse plane of the vehicle.

German Patent Application 196 00 138.2 describes an operating element arrangement for the control of longitudinal movement. Control is carried out by a manually actuatable regulating element according to an isometric arrangement and, alternatively, also in an active system configuration.

An object of the present invention is to provide an operating element arrangement which enables the vehicle driver to carry out an especially comfortable control of the vehicle longitudinal and transverse movements.

The foregoing object has been achieved in accordance with the present invention by providing an operating element arrangement having a manually actuatable regulating element arranged to be stationary in a longitudinal vehicle direction to control the longitudinal movement of the motor vehicle as a function of force exerted on the regulating element in the longitudinal vehicle direction, and arranged movably in a transverse vehicle direction to control the transverse movement of the vehicle as a function of one of transverse deflection of the regulating element and as a function of the actuating force exerted in the transverse vehicle direction.

In the arrangement of the present invention, the manually actuatable regulating element controls both longitudinal and transverse movement. The regulating element is configured isometrically, i.e. stationary in the vehicle longitudinal direction, with regard to the control of the longitudinal movement and configured movably, i.e. passively or actively, with regard to the control of the transverse movement in the vehicle transverse direction.

This system design for the operating element of the present invention makes it advantageously easier for the driver to decouple the actuating forces for the control of longitudinal movement, on one hand, and the control of transverse movement, on the other hand, because the regulating element now only moves in the transverse direction of the vehicle. This decoupling reliably prevents interference effects between the two actuation directions, so as, for example, to avoid inadvertently additionally triggering a steering action when a braking operation is activated.

Moreover, as regards the longitudinal actuation direction, the isometric configuration of the regulating element avoids the driver having to move not only his or her hand, but the driver's entire lower arm forwards and backwards, as occurs in the case of regulating elements movable in the longitudinal direction. By contrast, the movement of the regulating element in the transverse direction of the vehicle necessitates merely a rotation of the driver's hand or lower arm, while the position of the elbow remains unchanged.

Furthermore, an advantage of this system configuration is that the position of the regulating element in the vehicle transverse direction can be detected comparatively easily by the driver because the movability of the regulating element is restricted to the transverse plane. In a passive configuration of the regulating element transverse movement, the regulating element transverse position gives the driver information on the desired transverse-movement state predetermined by the driver for the vehicle, e.g. for the desired steering-angle value, while, in an active configuration, the transverse position contains information on the actual state of the vehicle transverse movement.

In an operating element arrangement according to the present invention, an active system configuration can be selected, in which the vehicle transverse movement is controlled as a function of the transverse deflection of the regulating element. Feedback on the actual state of the vehicle transverse movement is obtained by subjecting the regulating element to a corresponding reaction force.

BRIEF DESCRIPTION OF THE DRAWING

Other objects, advantages and novel features of the present invention will become apparent from the following detailed description of the invention when considered in conjunction with the sole FIGURE. The sole FIGURE is a diagrammatic side view of the relevant portion of a manually actuatable regulating element for controlling motor vehicle longitudinal and transverse movements according to the present invention.

DETAILED DESCRIPTION OF THE DRAWING

An operating element arrangement for controlling longitudinal and transverse movements of a motor vehicle has a manually actuatable regulating element designated generally by 1 which is arranged laterally of a driver's seat region on a center console portion 2. The regulating element contains a sleeve 1b, which is mounted on the center console 2 rotatably about an axis of rotation 3 parallel to the longitudinal axis of the vehicle, and a manually actuatable grip part 1a, which is articulated at one end on the outer casing of the sleeve 1b and extends upwards therefrom.

The articulation of the grip part 1a on the sleeve 1b is selected such that the grip part 1a is coupled to the sleeve 1b so as to be motionally rigid in the vehicle transverse direction of the vehicle, whereas, in the vehicle longitudinal direction, it would be pivotable per se relative to the sleeve 1b about an axis 4 parallel to the vehicle transverse axis of the vehicle. This pivotability is prevented, however, by a force sensor 5 which is connected, on one hand, to the sleeve 1b in a motionally rigid manner and, on the other hand, to the grip part 1a for the purpose of sensing actuating forces acting on the grip part 1a in the vehicle longitudinal direction. The force sensor 5 is followed by a conventional type of control unit (not shown) of the operating element arrangement. The control unit is configured in a known manner to trigger the associated longitudinal dynamics control actions in response to the corresponding actuations of the regulating element.

The operating element 1 is thereby configured isometrically with regard to its longitudinal actuation direction. That is, the operating element 1 remains fixed under the effect of an actuating force acting in the vehicle longitudinal direction and caused by the driver's hand grasping the grip part 1a, while the actuating force is recorded by the force sensor 5 and transmitted to the control unit which thereupon controls the longitudinal dynamics of the vehicle correspondingly.

In particular, control of the longitudinal movement preferably takes place such that the longitudinal speed of the vehicle is maintained as long as no longitudinally directed actuating force is exerted on the operating element 1. Thereby, fatigue or cramp in the region of the driver's hand, arm or shoulder is prevented. As soon as the driver presses the regulating element 1 forward by way of the grip part 1a, i.e. in the direction of the vehicle front, the operating element arrangement triggers an acceleration operation, while, in a similar way, it initiates a deceleration operation as soon as the driver exerts on the regulating element 1 a pull directed backwards, i.e. in the direction of the vehicle rear.

As regards transverse movement control, the regulating element 1 is configured passively. In other words, the regulating element 1 is actuated in the transverse direction to steer the vehicle, with the result that a rotational movement D about the rotation axis 3 of the sleeve is executed, and the steering angle is set as a function of the angle of rotation of the regulating element 1. For this purpose, the sleeve 1b is assigned a rotary potentiometer (not shown) to sense the rotary position of the sleeve 1b. The corresponding rotary-position information is transmitted from the rotary potentiometer to the control unit of the operating element arrangement, with the control unit selecting the associated steering angle in a known way.

Alternatively, an active configuration of the regulating element transverse movement can be provided, in that, by way of a corresponding actuator assembly, a reaction torque directed counter to the transverse actuation is exerted on the regulating element 1. The amount of the reaction torque is a measure of the actual steering-angle value obtained.

In a further embodiment, an active configuration of the transverse-movement functionality of the regulating element 1 can also be implemented by assigning a torque sensor to the sleeve 1b and by setting the steering angle as a function of the actuating torque acting on the sleeve 1b. At the same time, a corresponding actuator assembly carries out a rotational deflection of the sleeve 1b and consequently of the entire regulating element 1, for example as a function of the actual steering-angle value obtained in each case. The rotational deflection is capable of being perceived by the driver as feedback information on the actual state of the vehicle transverse movement.

In any event, as the above described and illustrated embodiment shows, the operating element arrangement according to the present invention results in a functional decoupling of the respective actuating forces on the uniform regulating element for controlling the vehicle longitudinal and the transverse dynamics. The decoupling is highly advantageous for vehicle driving. Moreover, the regulating element which controls both longitudinal movement and transverse movement can be actuated manually by the driver in an ergonomically favorable way. As a result, there is no need for a steering wheel or for an accelerator and brake pedal assembly.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle having an operating element arrangement for controlling longitudinal and transverse movements of the motor vehicle, comprising a manually actuatable regulating element arranged to be stationary or non-movably mounted in a longitudinal vehicle direction to control the longitudinal movement of the motor vehicle as a function of force exerted on the regulating element in the longitudinal vehicle direction, and arranged movably in a transverse vehicle direction to control the transverse movement of the vehicle as a function of one of transverse deflection of the regulating element and as a function of the actuating force exerted in the transverse vehicle direction.

2. The motor vehicle according to claim 1, wherein the regulating element is configured to have a reaction force automatically exerted thereon as a function of an actual state of the transverse movement of the vehicle.

3. The motor vehicle according to claim 1, wherein the manually actuatable regulating element is configured such that the actuating forces for control of movement in the vehicle longitudinal direction are decoupled from the control of movement in the transverse vehicle direction.

4. A method for controlling longitudinal and transverse movements of a motor vehicle, comprising the steps of controlling longitudinal movement of the motor vehicle as a function of force exerted on a regulating element arranged to be stationary in a longitudinal vehicle direction, and controlling transverse movement of the vehicle by movement of the regulating element in a transverse vehicle direction as a function of the transverse deflection of the regulating element or as a function of the activating force exerted in the vehicle transverse direction.

* * * * *